Dec. 12, 1939.  H. SCHERING ET AL  2,183,249
ILLUMINATING DEVICE FOR PROJECTORS
Filed Nov. 5, 1938   2 Sheets-Sheet 1

Inventors.
Helmuth Schering
Alfred Merz
BY: B. Singer & F. Stern
Attys

Dec. 12, 1939.    H. SCHERING ET AL    2,183,249
ILLUMINATING DEVICE FOR PROJECTORS
Filed Nov. 5, 1938    2 Sheets-Sheet 2

Inventors
Helmuth Schering
Alfred Merz
BY: B. Singer & F. Stern
Attys

Patented Dec. 12, 1939

2,183,249

UNITED STATES PATENT OFFICE 2,183,249

ILLUMINATING DEVICE FOR PROJECTORS

Helmuth Schering and Alfred Merz, Dresden, Germany, assignors to Zeiss Ikon Aktiengesellschaft, Dresden, Germany Application November 5, 1938, Serial No. 239,098
In Germany November 6, 1937

2 Claims. (Cl. 88—24)

The invention relates to improvements in illuminating devices for projectors, particularly motion picture projectors.

In the customary motion picture projectors the illuminating system usually comprises an arrangement which produces an image of the luminous area of the lamp and projects this image into the picture window or into the objective of the projector. If the image of the luminous area is homogeneous and of sufficient size, it usually is projected into the picture window, while an image which is not homogeneous and of insufficient size, as for instance in the case of incandescent lamps, is projected into the objective, in order to obtain a uniform illumination.

The efficiency of these illuminating systems is very low and the uniformity of the illumination of the picture window is not always satisfactory. At any rate these illuminating systems of the prior art are not suitable for the illumination of special motion picture films, as for instance film in natural colors.

It is an object of the present invention to provide an illuminating system whose uniformity of illumination is independent of the type, shape and size of the luminous area of the source of light, as for instance, an electric lamp.

It is also an object of the invention to provide an illuminating system for projectors in which the light efficiency is increased considerably by adapting the system to the shape of the employed luminous area and the shape of the picture window.

Other objects of the invention will be apparent or will be particularly pointed out in the following description forming a part of this specification, but the invention is not limited to the embodiments of the invention herein described, as various forms may be adopted within the scope of the claims.

Referring to the drawings.

Figure 1:
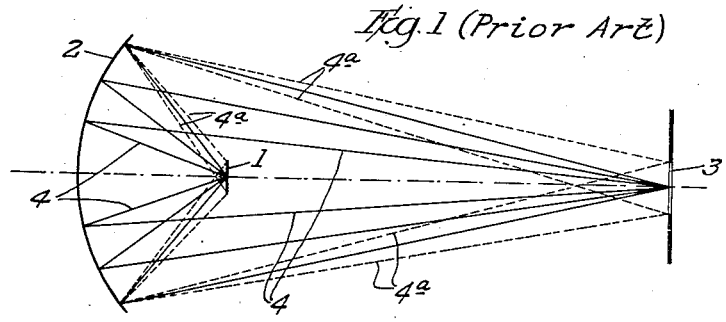
Fig. 1 illustrates diagrammatically an illuminating system of the prior art.

Fig. 1 illustrates a conventional illuminating system, in which an image of the luminous area 1 of the source of light is projected by a concave mirror 2 into the picture window 3 of the projector. The projection is illustrated by a number of rays 4 which, disregarding any optical errors of the system, emanate from the center of the luminous area 1 and intersect in the center of the picture window area. This illuminating system yields only then a uniform illumination of the picture window when the luminous area 1 is so large that its image completely covers the picture window and when the luminous area within the zone enclosed by the marginal rays 4ª, indicated by the dotted lines, possesses a uniform luminous density. Aside from this, the luminous area 1 would have to be shaped similarly to the shape of the picture window, which usually is rectangular, in order to avoid losses of light, a condition which in practice is seldom, if ever, fulfilled.

Since all illuminating devices have considerable optical errors, it is customary to make the luminous area 1 substantially larger than would be necessary for the particular size of the picture window, in order to obtain a uniform illumination of the same, and obviously, this results in very substantial losses of energy.

Figure 2:
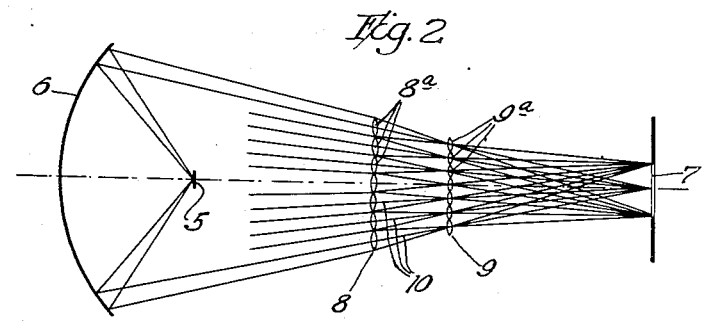
Fig. 2 illustrates diagrammatically an illuminating system of the present invention.

In Fig. 2, which illustrates one embodiment of the invention an image of the luminous area 5 of the source of light is also projected by a concave mirror 6 into the picture window 7, however, there are arranged in the path of the reflected beam of light between the mirror 6 and the picture window 7 two axially spaced lens screens 8 and 9 which modify the reflected light beam. Each of the lens screens 8 and 9 consists of a multiplicity of individual lenses abutting each other without gaps in juxtaposed relation. In the theoretically simplest case, the lenses are positioned relatively to each other in such manner that the extensions of all the lines 10 connecting the centers of the individual lenses 8ª of the lens screens 8 with the centers of the correspondingly lenses 9ª of the lens screen 9 intersect in the center of the picture window 7, provided the illuminating system is free of aberration.

The focal length of the individual lenses 8ª of the lens screen 8 is such that each of the individual lenses 8ª produces an image of the luminous area 5 in its associated individual lens 9ª of the lens screen 9 which latter is closest to the picture window 7. Accordingly, there will be produced in the plane of the lens screen 9 as many images of the luminous area 5 as there are provided individual lenses.

The focal length of the individual lenses 9ª of the lens screen 9 is such that each of the individual lenses 9a projects an enlarged image of its associated lens 8a into the picture window. Since each individual lens 8a of the lens screen 8 "sees" as uniformly illuminated, there will be produced in the picture window 7 as many superposed images of uniform luminous areas as there are provided individual lenses.

Figure 3:
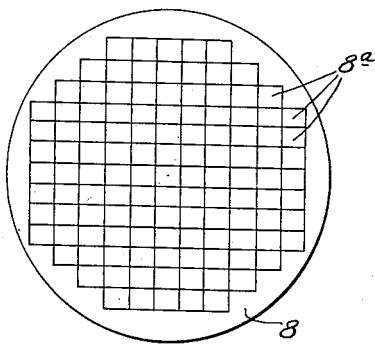
Figs. 3 to 8 illustrate diagrammatically front views of various lens screens which may be employed in the illuminating system of the present invention, and the Figs. 9 and 10 illustrate each a modified embodiment of the illuminating system of the present invention.
Figure 4:
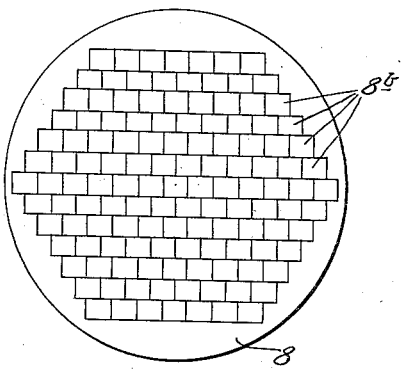

The accuracy with which the images of the luminous area are brought into superposition in the picture window is governed by the accuracy of the arrangement and the position of the two lens screens. According to the invention the outline of the individual lenses of the lens screen 8 is made equal or at least practically equal to the outline of the area to be illuminated in the picture window plane. Since the picture window in projectors, particularly motion picture projectors, is usually rectangular, the individual lenses 8a are provided with a corresponding rectangular outline. Such rectangularly shaped lenses 8a may be arranged in vertical and horizontal rows forming crossing lines, as illustrated in Fig. 3, or in horizontal rows in which the lenses 8b in adjacent rows are staggered with respect to each other, as illustrated in Fig. 4.

It is believed to be apparent from the above description that the best utilization of the light is obtained when the images of the luminous area 5 completely fill out the area of each of the individual lenses 9a of the lens screen 9.

Figure 5:
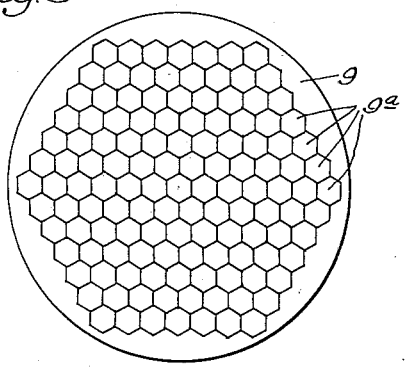

It is accordingly another object of the invention to provide the individual lenses 9a of the lens screen 9, which is closest to the picture window 7, with an outline which as far as practical conforms to the outline of the luminous area 5. If, for instance an arc lamp is employed as source of light, whose carbons are circular in cross section, then the luminous area formed by the positive crater is approximately circular. The individual lenses 9a preferably should have the same shape. Since, however, the individual lenses 9a should abut each other without any gap, the lens screen 9 is composed, in case of an arc lamp which is principally used, of a plurality of hexangular lenses 9a arranged in honeycomb style as illustrated in Fig. 5.

Since in accordance with the invention the extension of the lines which connect the center points of each of the individual lenses 8a with the center points of each of their associated lenses 9a are to intersect in the center of the picture window 7, it is necessary that the geometric center points of the individual lenses of both lens screens should be positioned alike, so as to form the same geometric figure when the points in each plane are connected with each other. This condition can best be fulfilled when for instance the geometric center points of the rectangular lenses 8a of the lens screen 8 are arranged at the corners of the meshes of a network whose meshes form a parallelogram when the outline of the individual lenses 9a of the other lens screen 9 is not rectangular. Preferably, a lens screen as illustrated in Fig. 4 is used in combination with a lens screen 9 as illustrated in Fig. 5.

Figure 6:
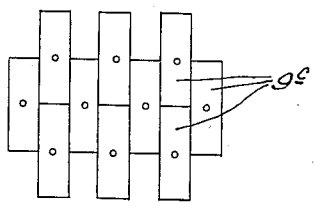
Figure 7:
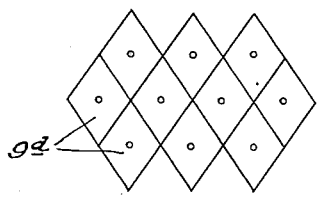
Figure 8:
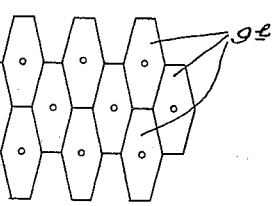

The Figs. 6, 7 and 8 illustrate the arrangement of the individual lenses 9c, 9d and 9e respectively on lens screens which are intended to be used in combination with light sources whose luminous areas are other than circular.

As far as the uniformity of the illumination of the picture is concerned, it does not make any difference whether the images of the luminous area are smaller than the area of the individual lenses 9a or whether the images of the luminous area are not of uniform brightness, or whether the images are not acurately centered with respect to the center point of the individual lenses 9a. The illumination of the picture window 3 and therewith the picture appearing on the projection screen will always be uniform. Therefore, the illuminating device of the invention produces a uniform illumination independent of the size and shape of the source of light and the adjustment of the light source with respect to the reflecting mirror.

Figure 9:
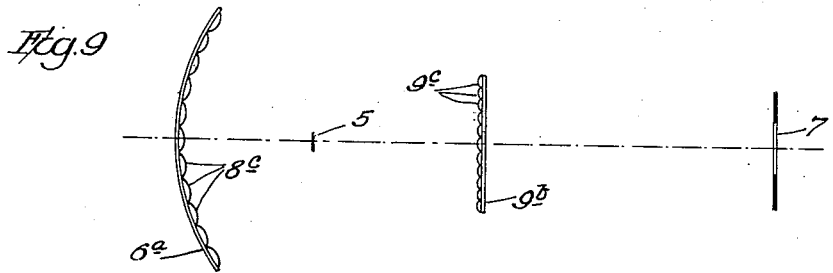
Figure 10:
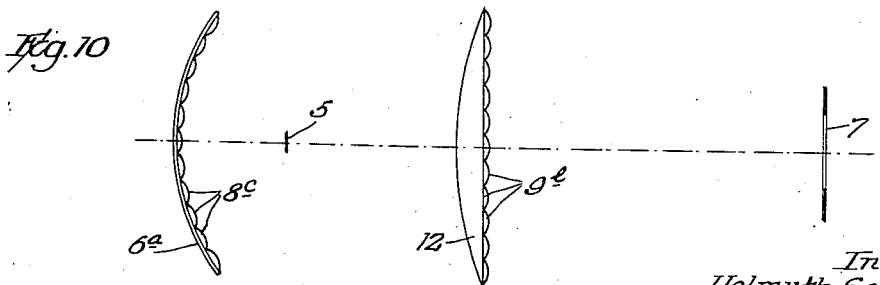

The illuminating system illustrated in Fig. 2 may be simplified and improved by mounting the lens screen 8 directly upon the concave reflecting face of the mirror 6 as illustrated in Figs. 9 and 10. The lenses 8c may be formed integrally with the mirror 6a or the lenses 8c may also be cemented individually on the concave face of the mirror 6a. Such an arrangement of the lens screen eliminates the loss of light which always takes place due to surface reflection, when the lens screen plate 8 is mounted as separated member in the path of a light beam. In Fig. 9, an image of the luminous area 5 of the lamp is produced by each of the individual lenses 8c on the mirror 6a in their associated individual lenses 9c of the lens screen 9b, and each individual lens 9c in turn projects an image of its associated lens 8c into the picture window 7.

Fig. 10 illustrates a modification of the illuminating system of Fig. 9. The light rays which are reflected from the mirror 6a approximately in parallel relation to the optical axis of the system are combined in the picture window 7 by a condenser lens 12, on whose plane face respectively concave face individual lenses 9e forming a lens screen are arranged. The condenser lens 12 may be integrally formed with the individual lenses 9e, or the lenses 9e may be cemented or otherwise secured individually to the plane face of the condenser lens 12. This arrangement constitutes an improvement of a still higher order, since another loss of light is eliminated which otherwise occurs due to reflection when the lens screen 9 is mounted as separate member in the path of the light beam.

What we claim as our invention is:

1. In an illuminating system, particularly for picture projectors, a source of light, a picture window, and optical means for producing an uniform illumination of said picture window, said optical means including a mirror in rear of said source of light, said mirror converging the light rays of said source of light to said picture window, and a multiplicity of individual lenses forming a lens screen on the reflecting face of said mirror, and a second lens screen comprising a transparent plate, one face of said plate being provided with a multiplicity of individual lenses, said plate being positioned between said source of light and said picture window, the plane of said source of light and the plane of said second lens screen being conjugated in respect of the lens screen on the reflecting face of said mirror, the lens screen on the reflecting face of said mirror and the plane of said picture window being conjugated in respect of said second lens screen.

2. In an illuminating system, particularly for picture projectors, a source of light, a picture window, and optical means for producing an uniform illumination of said picture window, said optical means including a mirror in rear of said source of light, said mirror converging the light rays of said source of light to said picture window, and a multiplicity of individual lenses forming a lens screen on the reflecting face of said mirror, and a second lens screen comprising a transparent plate, one face of said plate being provided with a multiplicity of individual lenses, one for each said lenses on said mirror, said plate being positioned between said source of light and said picture window, the plane of said source of light and the plane of said second lens screen being conjugated in respect of the lens screen on the reflecting face of said mirror, the lens screen on the reflecting face of said mirror and the plane of said picture window being conjugated in respect of said second lens screen.

HELMUTH SCHERING.
ALFRED MERZ.